Figure 5:
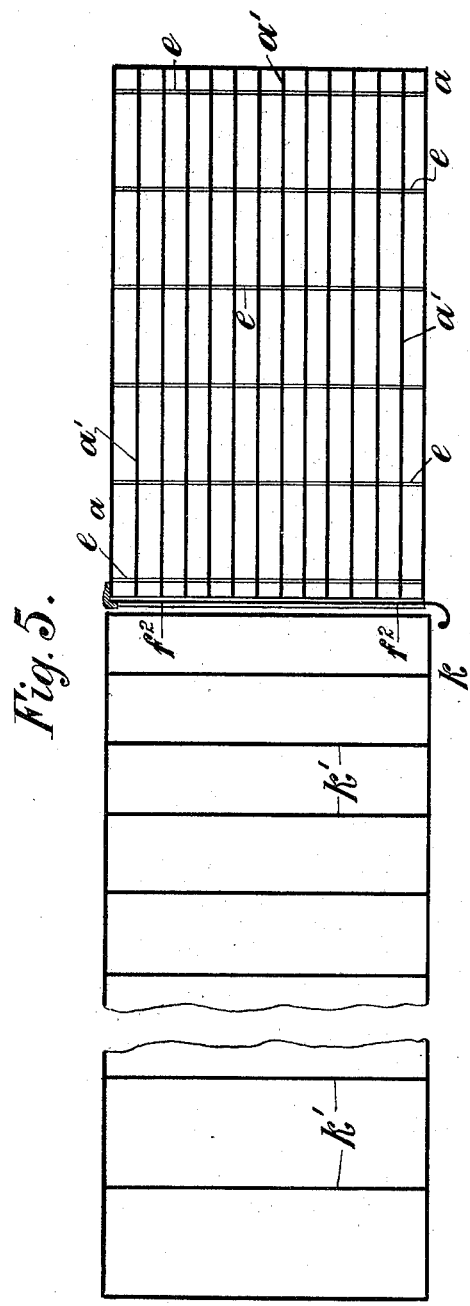

(No Model.) 9 Sheets—Sheet 1.
H. H. HANMER.
COIN ASSORTING APPARATUS.
No. 566,453. Patented Aug. 25, 1896.
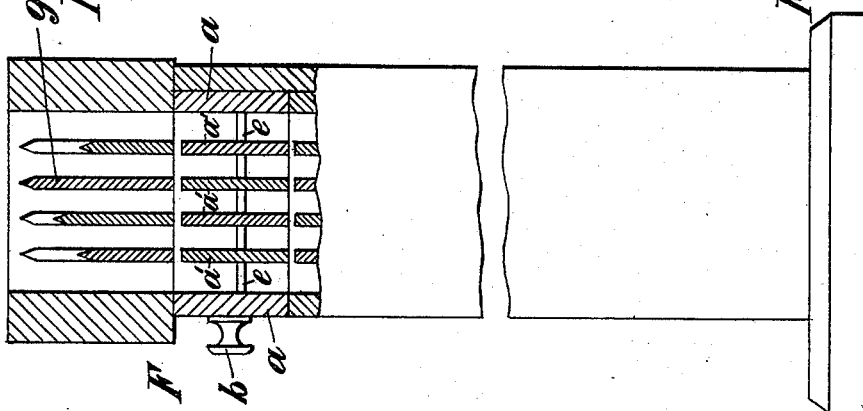
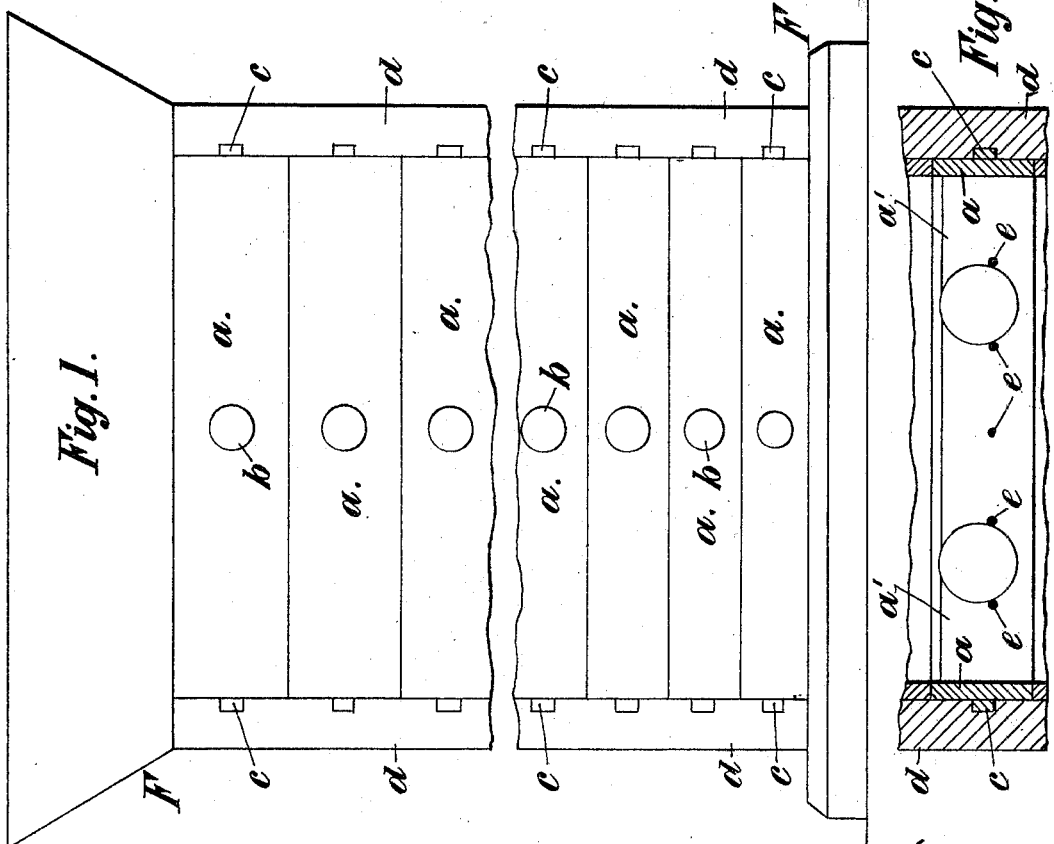
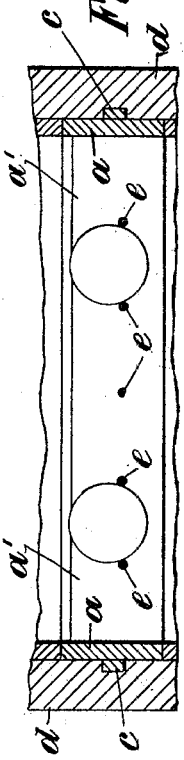

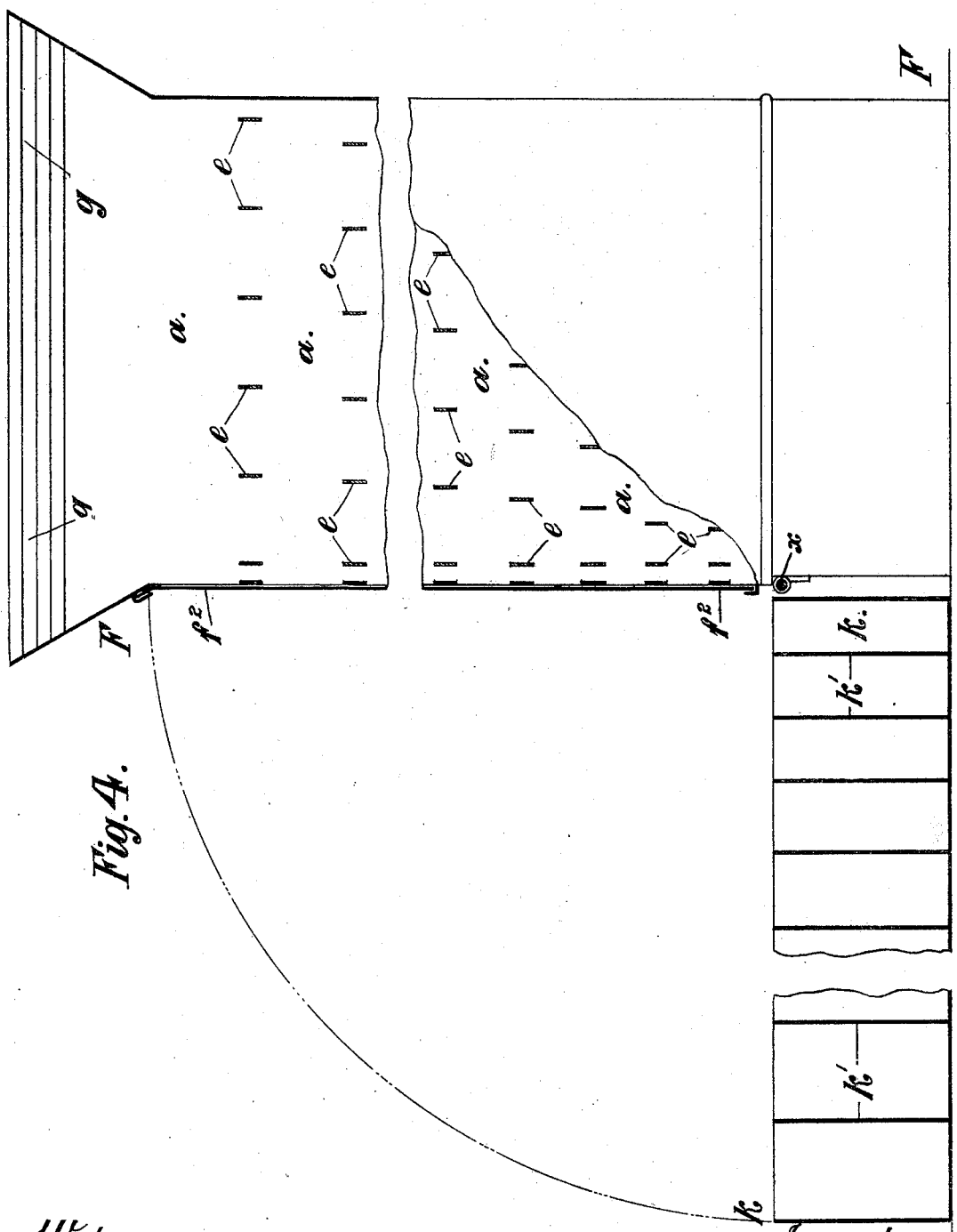

(No Model.) 9 Sheets—Sheet 3.

H. H. HANMER.
COIN ASSORTING APPARATUS.

No. 566,453. Patented Aug. 25, 1896.

Fig. 6ᴬ.

Witnesses. Inventor.
Henry Howard Hanmer
by
Attorneys (No Model.) 9 Sheets—Sheet 4.
H. H. HANMER.
COIN ASSORTING APPARATUS.

No. 566,453. Patented Aug. 25, 1896.

Witnesses. Inventor.
Henry Howard Hanmer
by
Attorneys (No Model.)

9 Sheets—Sheet 5.

H. H. HANMER.
COIN ASSORTING APPARATUS.

No. 566,453.  Patented Aug. 25, 1896.

Witnesses.
H. van Dedennel
E. K. Sturtevant

Inventor.
Henry Howard Hanmer
by Richardson
Attorneys (No Model.)
9 Sheets—Sheet 6

H. H. HANMER.
COIN ASSORTING APPARATUS.

No. 566,453. Patented Aug. 25, 1896.

Witnesses.

Inventor.
Henry Howard Hanmer
by
Attorneys (No Model.) 9 Sheets—Sheet 7.

H. H. HANMER.
COIN ASSORTING APPARATUS.

No. 566,453. Patented Aug. 25, 1896.

Witnesses.
H. van Oldennee
E. K. Sturtevant

Inventor.
Henry Howard Hanmer
by
Attorneys (No Model.) 9 Sheets—Sheet 8.
H. H. HANMER.
COIN ASSORTING APPARATUS.
No. 566,453. Patented Aug. 25, 1896.
*Fig. 12.*
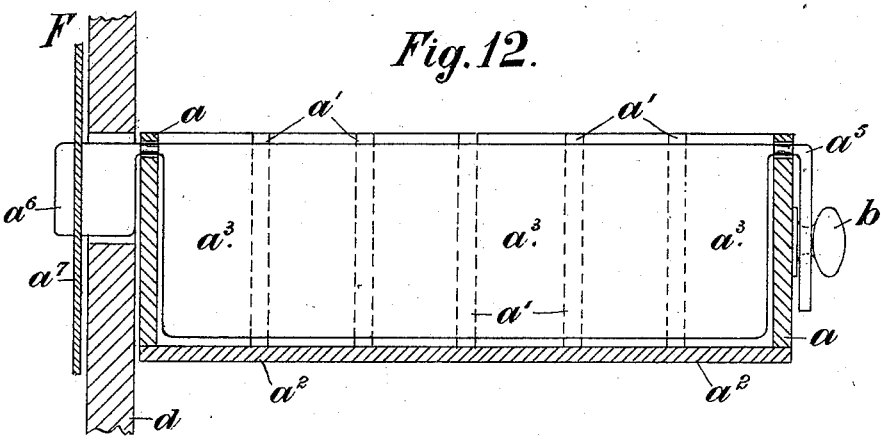
*Fig. 12ᴬ.*
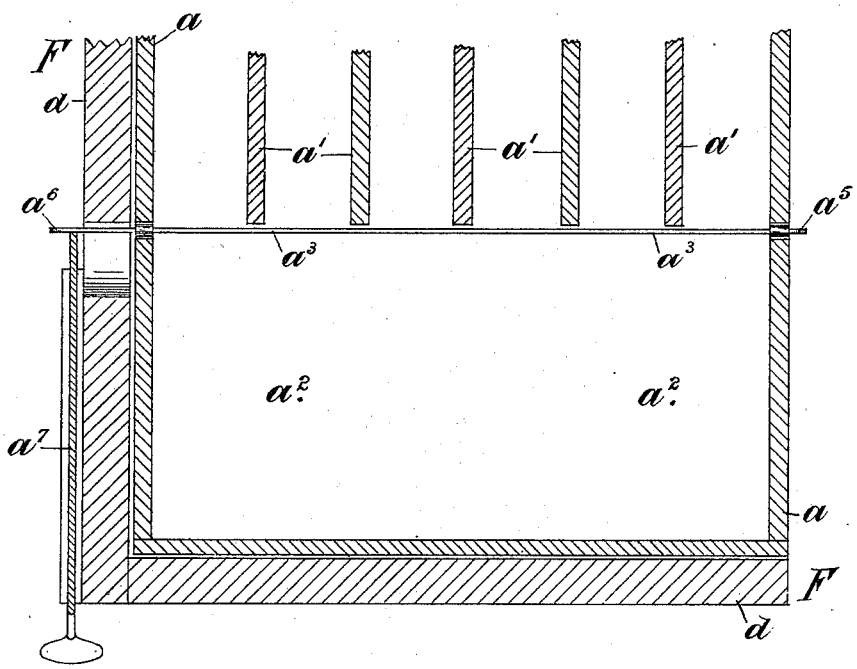
Witnesses.
H. van Oldenneel
E. R. Sturtevant
Inventor.
Henry Howard Hanmer
by
Attorneys (No Model.)  H. H. HANMER.  9 Sheets—Sheet 9.
COIN ASSORTING APPARATUS.
No. 566,453.  Patented Aug. 25, 1896.
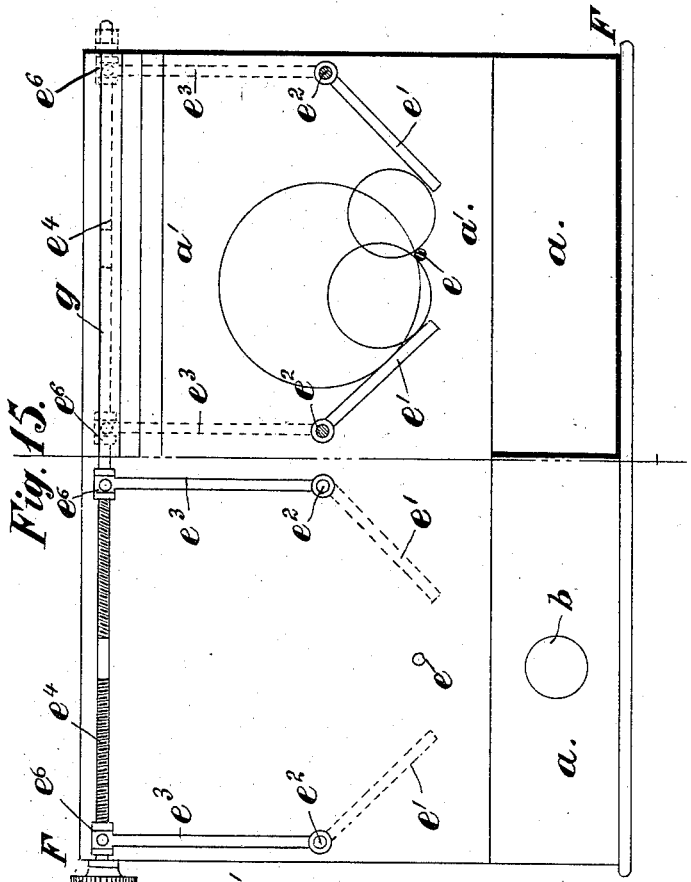
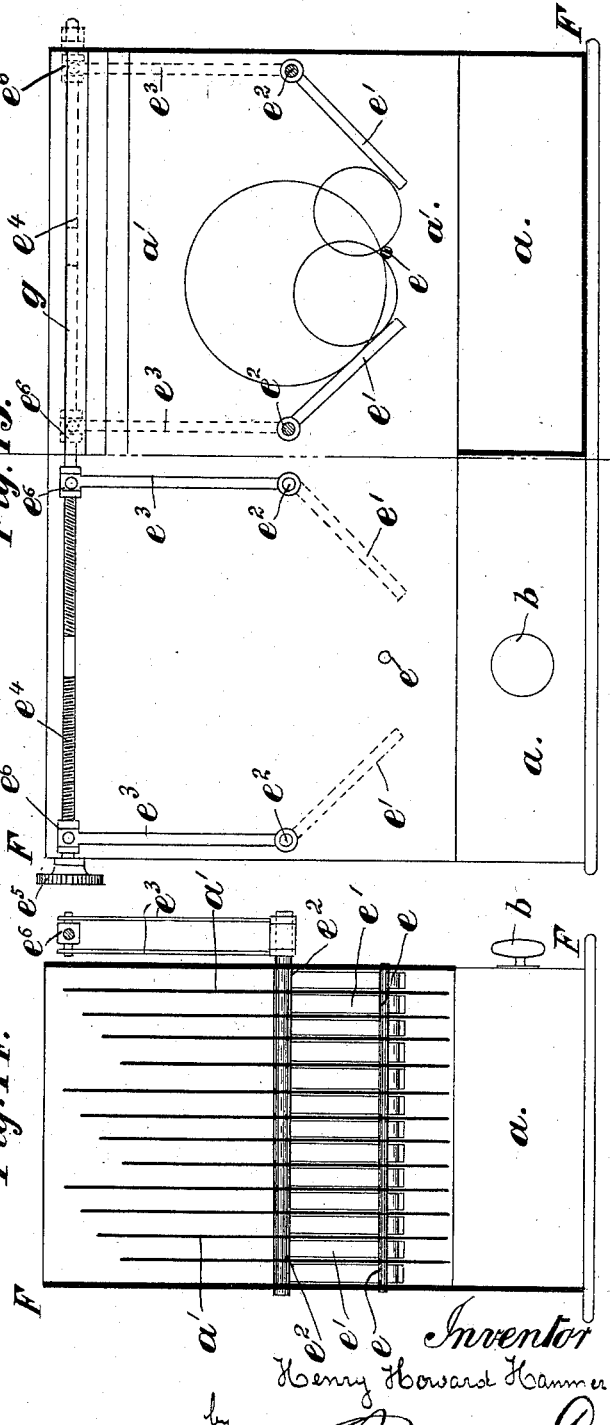
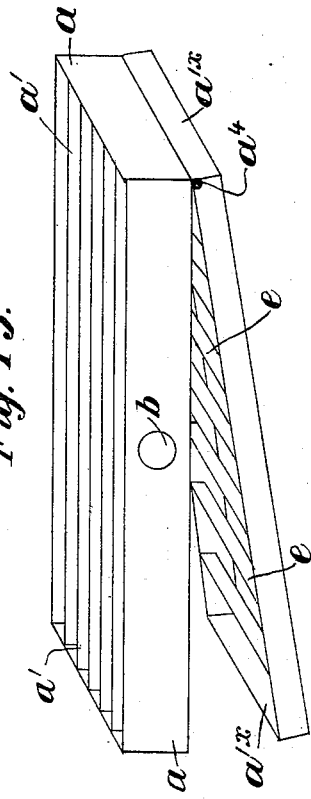
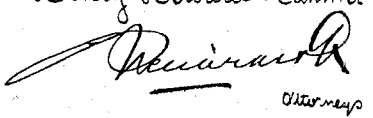

UNITED STATES PATENT OFFICE.

HENRY HOWARD HANMER, OF LIVERPOOL, ENGLAND.

COIN-ASSORTING APPARATUS.

SPECIFICATION forming part of Letters Patent No. 566,453, dated August 25, 1896.

Application filed May 1, 1895. Serial No. 547,760. (No model.)

*To all whom it may concern:*

Be it known that I, HENRY HOWARD HANMER, a subject of the Queen of Great Britain and Ireland, residing at Liverpool, in the county of Lancaster, England, have invented new and useful Improvements in Coin-Sorting Apparatus, of which the following is a specification.

This invention has reference to apparatus for sorting coins of different sizes, ranging from the smallest to the largest; and it has mainly for its object to obviate the large amount of time which is now used in counting and sorting mixed quantities of coins.

According to this invention an apparatus comprises in most cases a series of parts one above the other or at different levels, which parts are constructed and adapted to deal or be used in connection with coins of different size. The apparatus or parts referred to comprise a casing having one or more chambers or spaces within it of considerable depth, but of comparatively narrow width, while the length is according to the size generally of the machine. In each of these different spaces or chambers and at the lower part of same there will be provided a bar or bars, or the like, spaced apart for catching and holding the coins. The coins to be sorted are tipped into the upper part of the apparatus, which has divisions which are at different levels at their upper edges, so that the coins of themselves enter and fall down into the apparatus edgewise and uprightly only and they pass down into the apparatus freely and at once.

Examples of apparatus according to this invention are illustrated in the accompanying drawings.

Figure 6:
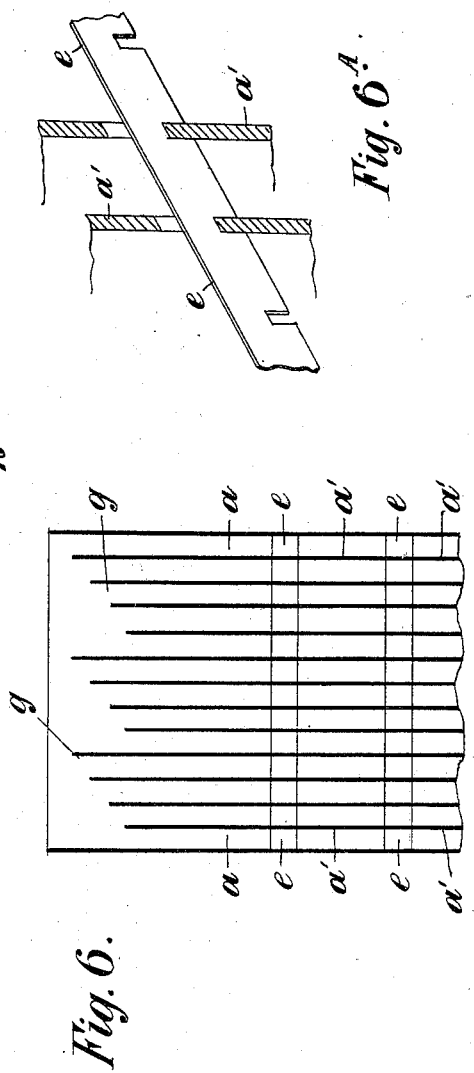
Figure 7:
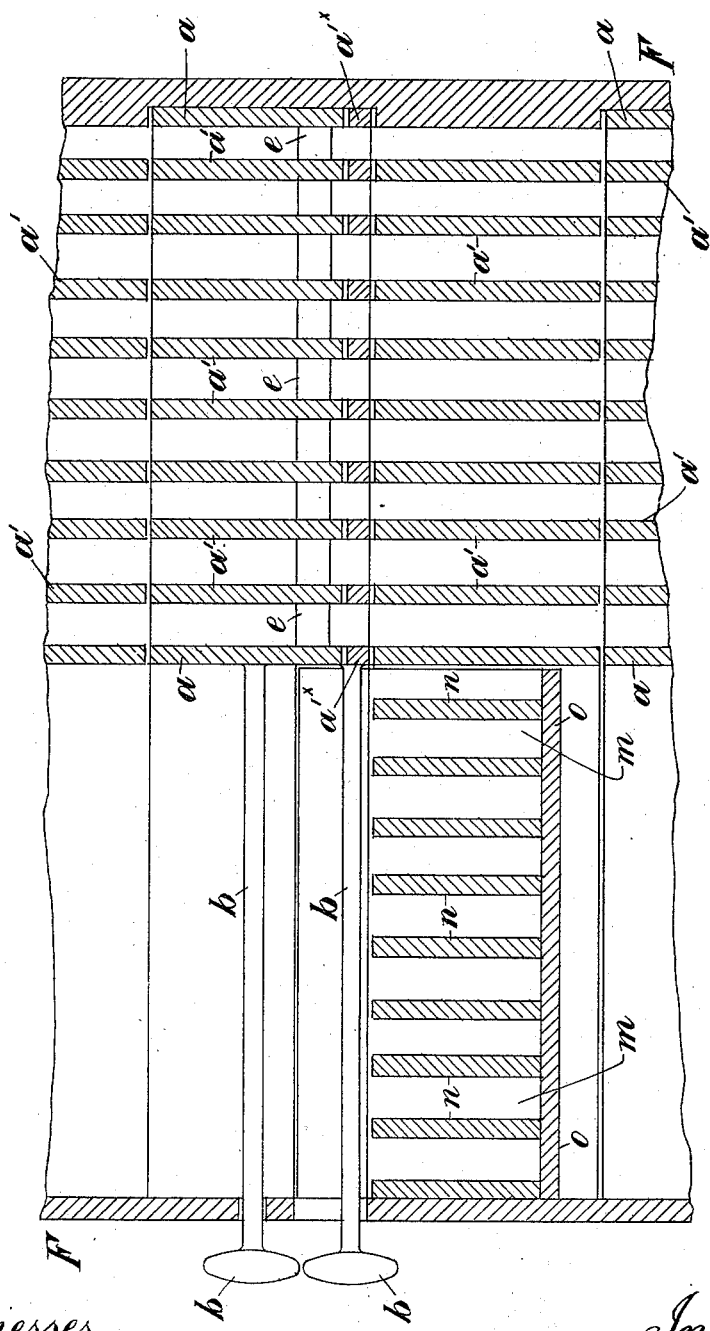
Figure 8:
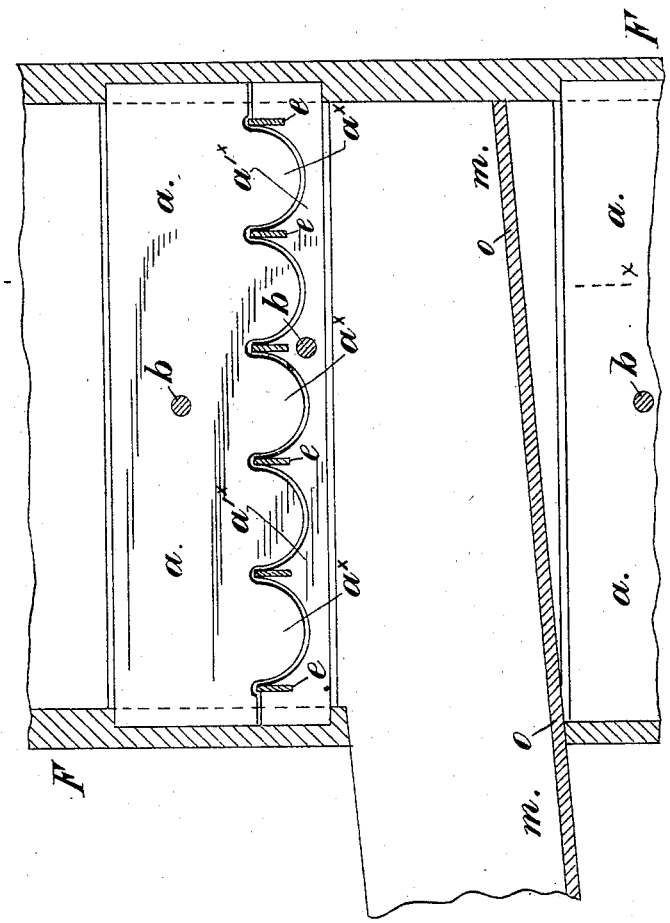
Figures 9, 11:
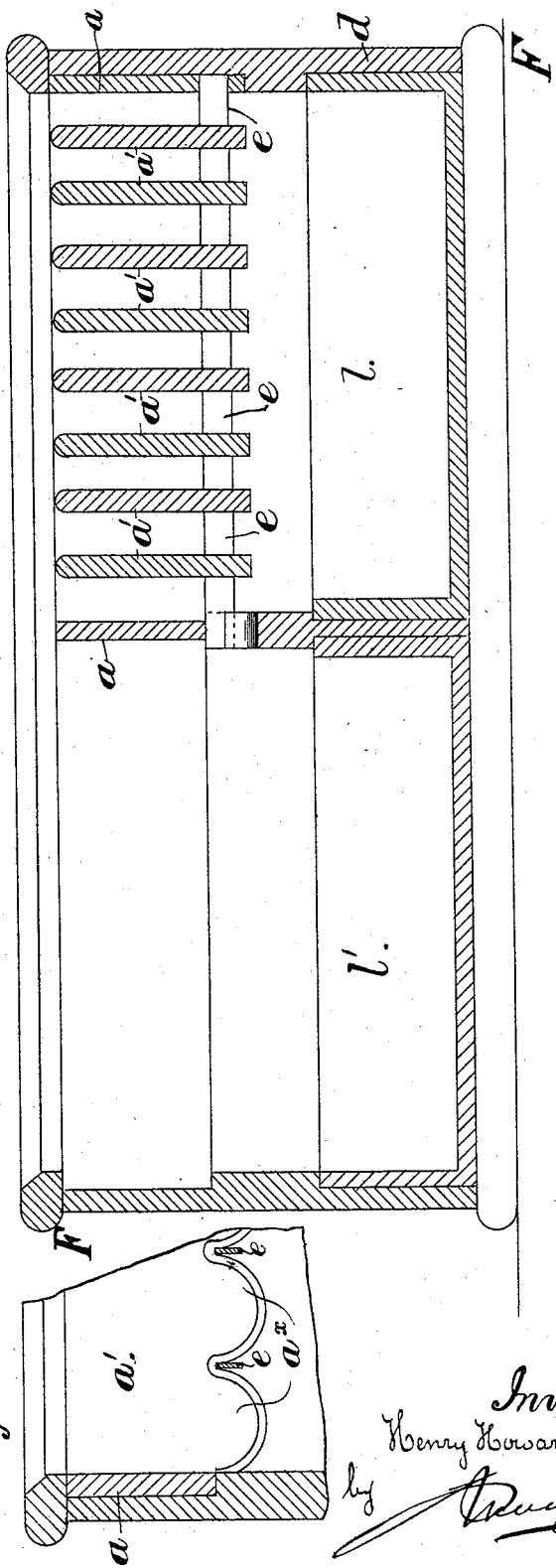
Figure 10:
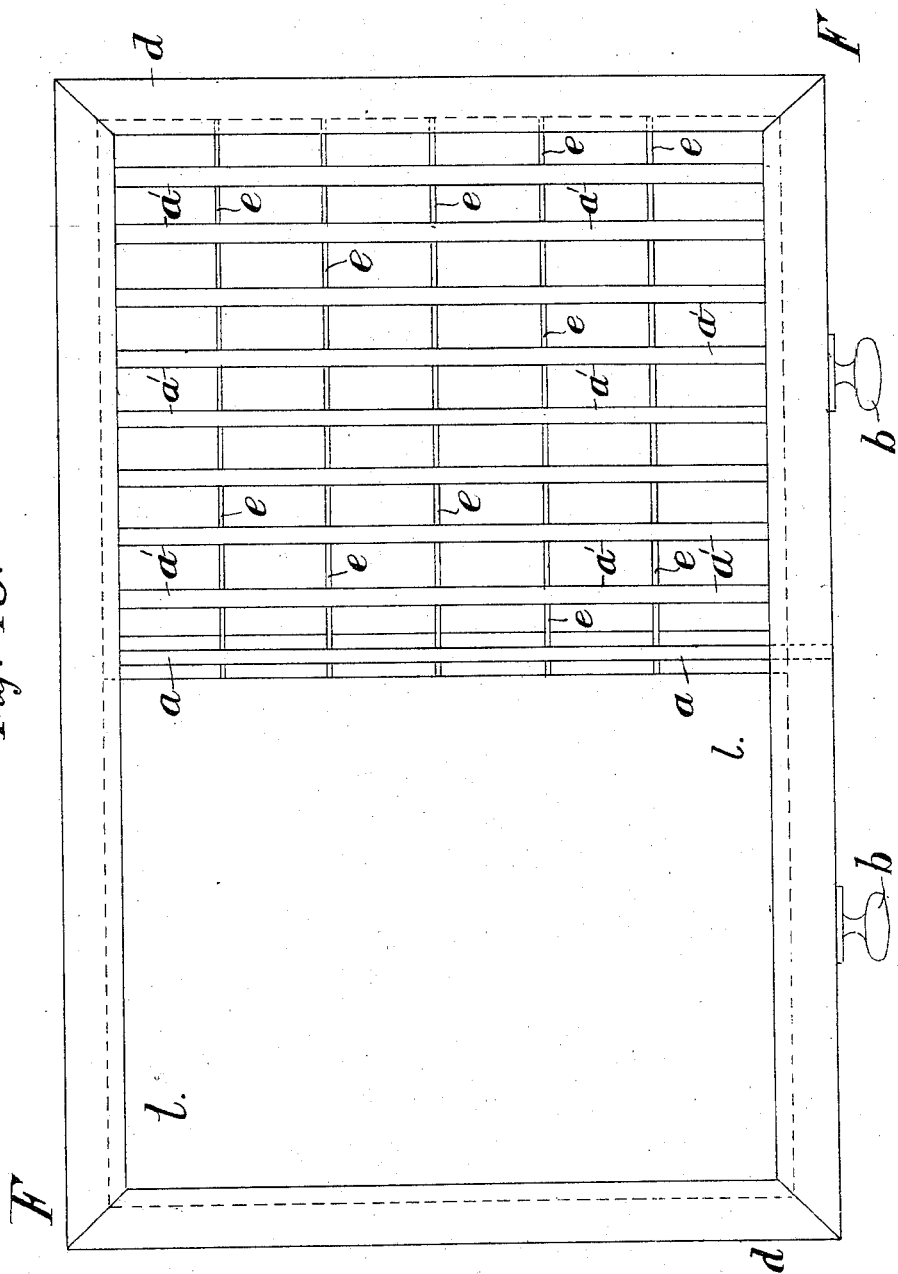

In the drawings, Figures 1, 2, and 3 illustrate in front elevation, side elevation, partly in section, and in sectional elevation one arrangement of sorting apparatus according to this invention. Figs. 4, 5, and 6 are sectional elevation, sectional plan, and cross-sectional elevation, and Fig. 6ª an enlarged detail view, of another sorting apparatus provided with my improvements. Figs. 7 and 8 are respectively side and end elevations in section, illustrating a sorter according to this invention where the coins are sorted and caused to pass away from the apparatus or delivered from it as they are sorted by conduits, Fig. 7 being a section on line $xx$ of Fig. 8. Figs. 9 and 10 are sectional elevation and plan, respectively, and Fig. 11 is a detail in sectional view, of another modification according to this invention for sorting two sizes of coin only. Figs. 12, 12ª, and 13 show two modifications of trays. Figs. 14 and 15 are respectively a cross-section and a front elevation of a further modification in the form of the apparatus.

Referring in the first instance to the apparatus shown in Figs. 1 to 3, the sorter illustrated in these figures comprises a number of sorting-trays, generally designated $a$, and these trays in this arrangement are removable in the manner of drawers, they being provided with knobs $b$, by which they are pulled in and out, and sliding edges $c$, which slide in suitable grooves in the side pieces $d$ $d$ of the case or frame, the whole of which is generally designated F. The successive trays are of course for sorting and holding the coins which are next in size smaller in diameter than that which is sorted and caught by the tray next above.

Each of the sorting-trays $a$ consists of a plurality of vertical partitions $a'$, which form the trays into a plurality of vertically-disposed chambers or channels of relatively small width, and cross-bars $e$, which divide or form these channels into a plurality of meshes or passages through them, the action being that by letting the coins fall onto the upper edges of the partitions $a'$ the coins pass into and down the channels, and those which are in diameter larger than the meshes, that is, larger than the distance apart of the bars $e$, are caught by such bars, as seen in Fig. 3, while those which are of less diameter than these meshes or distances apart falling through them.

The upper part of the apparatus into which the coins to be sorted are tipped is of the same mode of construction as the trays, namely, it is provided with partitions $g$, the upper edges of which are arranged at different levels, as shown, so that the channels or chambers between them will receive coins edgewise and uprightly only, that is, these partitions, made as described and shown, cause the coins to pass edgewise into the spaces between them, and the coins thereby received pass at once in this manner and freely down into and through the apparatus.

With regard to the different trays $a$ of the apparatus, those for the smaller coins are not necessarily so deep as those for the larger, besides which, of course, there is the essential difference between them that the different trays will have their sorting-bars $e$ spaced apart at different distances, that is, the meshes in each tray will be different, such distances in any tray being less than the diameter of the coin it is adapted to sort and hold and greater than the diameter of any coin which is in diameter the next smallest to it, that is, of all coins of less diameter than it.

The general operation of the apparatus is that coins in bulk or quantity are poured or delivered onto the upper part of the apparatus. By the partitions $g$ they are given the edgewise or vertical position and in this position fall down the spaces between them into the channels or spaces between the partitions of the uppermost tray $a$. In this tray the largest coins are arrested and held, all others passing through its meshes and falling into the next tray below, whereby the next largest sized coins are arrested and held, and so on throughout the apparatus, each tray catching and sorting only that size and value of coin which it is designed to catch and sort. When the coins have all settled, the trays are withdrawn by their knobs $b$, and the sorted coins of each are tipped out into a suitable receptacle. The lowermost division, namely, No. 7, for the smallest coins is not necessarily a sorter, but merely an ordinary drawer. The upper and lower edges of the partitions come closely up to the under edges and upper edges of those above and below them, respectively, and are practically continuous throughout the apparatus. As regards the width of the channels between the partitions of the trays, about from one-eighth to three-eighths of an inch I find suitable. The more drawers there are the closer should be the partitions.

Figs. 4 to 6 show a sorter constructed of metal. The trays $a$ in this case are not movable drawers, the coins sorted in this case being removed from the side of it by tipping or moving it about a hinge $x$ at one corner thereof. In this modification the partitions $a'$ and the partitions $g$ are in one, they being made of continuous plates or sheets of metal, while the bars $e$ are passed through slots the required distances apart in these plates, the bars being gapped at their lower edges, so that when in place they drop down and the tongues between the gaps lie between the plates and form distance-pieces thereto, the bars being held in position in any suitable way. This is illustrated in Fig. 6$^a$. Thus the trays in this arrangement, although they exist in a similar relative arrangement and manner to those shown in Figs. 1 to 3, are not removable, but are all formed together.

To allow of the coins being removed after the sorting has taken place, the apparatus is turned about the hinge $x$ over a chest or box $k$, made into a number of divisions by having partitions $k'$ therein; and when the apparatus is turned down over this, the plate $f^2$, forming the end or side of the apparatus, (it being in the shape of a withdrawable plate,) is withdrawn or pulled out to one side and thereby allows the coins in the different trays to fall down into the different receptacles of the chest $k$ provided for them. From the receptacle $k$ the coins may pass by conduits to tills or other receptacles, if desired. The upper edges of the partitions $g$ are arranged, as in Fig. 2, at different levels.

In the modification shown in Figs. 7 and 8 the coins are sorted and pass away from and down suitable conduits to different receptacles without the tipping action. The sorting-trays in this case are the same as those in Figs. 1 to 3, namely, deep partitions $a'$ close together to keep the coins upright, and the transverse bars $e$, which, with the partitions $a'$, form the mesh. These two parts, however, in this case are not made in one, but are separate, both being in the form of drawers, the drawer comprising the partitions $a'$, however, having a certain amount of movement within the frame $f$, while the part bearing the bars $e$ has the same movement within the apparatus, but in addition, also, can be drawn out of the frame. The conduits down which the coins run or pass from the apparatus are designated $m$, and consist of partitions $n$ and a floor $o$, the partitions being similarly disposed to those of the trays $a$, the whole of this mechanism for conveying away the coins being disposed at one side of the case F, while the sorting parts are at the other side. The part of the tray $a$ containing the bars $e$ is designated $a'^\times$ and slides in the frame F exactly as the tray $a$, with the exception, as stated, that the part $a'^\times$ draws practically completely out of the case, with just a stop to prevent it being pulled completely out. In action both drawers are pulled out together when the coins are sorted, so that the partitions $a'$ stand above the partitions $n$. Then the drawer $a'^\times$ is drawn farther out, so as to withdraw the bars $e$ from under the coins, the effect, of course, of which is that the coins fall down into the conduits $m$ (which are inclined) and run down them to any suitable point. In this type of apparatus—which may be used in any case where the coins are moved along their supporting or catching bars—the partitions $a'$ have pendent parts $a^\times$, which extend down and sweep between the bars $e$ when moved, and so bear both at the top and the bottom of the coin, avoiding thereby jamming of the parts in this action. Continuity of partitions through the apparatus is provided by intervening partitions $o$.

A simple single-tray apparatus according to this invention for sorting two sizes of coins is illustrated in Figs. 9 and 11. This is the same type of apparatus as shown in Figs. 7 and 8 as regards the mode of action. The transverse sorting or holding bars $e$ are in this case stationary and the partitions $a'$ movable. When the coins are placed on the top of the tray $a$, the larger of the two will be caught by the mesh-bars $e$, the smaller ones falling through into the bottom of the apparatus. To remove those caught and held, the tray $a$ is slid from one side to the other of the frame $f$, and the coins supported on the bars $e$ are swept off into the space at the other side of the apparatus. Drawers $l$ and $l'$ are provided in the bottom of the apparatus, so that the drawer $l$ will receive the smaller coins as they fall between the bars $e$, while, on the other hand, when the tray $a$ is moved to the opposite side of the apparatus where there are no bars, the larger coins will fall into the drawer $l'$ and these drawers are withdrawn after the sorting is complete and their contents removed.

The modification shown in Figs. 12 and 12$^a$ consists in providing, in connection with the trays or drawers at one end, an open drawer $a^2$, with a solid bottom, into which the coins may be run after sorting by tipping the draw to the one side. From this open part the coins may be readily withdrawn, and this may be assisted by making the bottom corrugated. To prevent the coins passing into this part of the tray at times other than when desired, a locking or hinged flap $a^3$ is provided at the ends of the partitions $a'$. The front of this flap outside the drawer is provided with a lever $a^5$, which also acts as an indicator, and at the other end with the part $a^6$, which projects through the back of the case of the apparatus, while a slide $a^7$ is provided at the back, which, when pushed in, as shown in the figures, keeps all the flaps $a^3$ closed, and when it is drawn back, and the apparatus is tilted to one side, the coins pass under the flap $a^3$ into this tray portion $a^2$, from which they are readily withdrawn when the drawer is taken out.

Regarding the modification shown in Fig. 13, the drawer illustrated therein is made in two parts, the upper part comprising the partitions $a'$, and the lower part, which is hinged at $a^4$ to the upper part of the tray, the bars $e$. When the tray or drawer is removed from off the part $a'^\times$, about the hinge $a^4$, the coins resting upon the bars $e$ can be quickly removed by hand. In some cases, in sorters adapted to sort silver and copper, (or silver only,) more than one size and value of coin may be caught and held in a single tray.

Figs. 14 and 15 are cross-section and front elevation, partly in section, of a modified apparatus having the same characteristics above described for keeping the coins upright or vertical, but adapted by movable means in a single-tray arrangement to sort different sizes of coins, namely: In this case the gages or bars $e$, which pass the coins or hold them, as the case may be, are movable instead of fixed, or some of them are movable. In the example given there are fixed bars $e$, and also movable bars or arms $e'$, the latter being carried by shafts $e^2$, running across the apparatus, and which rods are worked and so moved that the arms $e'$ move closer to or farther from one another. In the drawings this is effected by levers $e^3$ on the outer ends of the shafts $e^2$, which are operated by right and left hand threads on the shaft $e^4$, which is rotated by a thumb-screw $e^5$, said screws working through the nuts $e^6$ on the levers $e^3$. By providing a suitable indicator in connection with this operating mechanism the amount of opening by a given movement may be indicated thereon, and so different sizes of coins passed for the different amounts of opening. The coins from these gages $e$ drop into drawers below, from which they are withdrawn.

What is claimed in respect of the herein-described invention is—

1. A coin-sorting apparatus comprising a hopper for the coins, a series of vertical partitions therein forming narrow and deep passages open at the bottom, a receiver beneath the hopper having similar partitions and passages and horizontal stops in said receiver extending transversely of the passages and at a distance apart less than the coin it is desired to hold, substantially as described.

2. A coin-sorting apparatus comprising a plurality of vertical partitions forming narrow and deep passages arranged to receive the coin edgewise, said partitions having their upper edges arranged at varying levels whereby the coins will automatically enter the passages edgewise, and stops extending transversely of the passage-ways and arranged to separate the coins, substantially as described.

3. Coin-sorting apparatus comprising vertical partitions disposed closely together, and of a depth relatively great, to the distance apart of said partitions, and forming relatively narrow and deep passages, by which the coins which are introduced into the said passages between said partitions are maintained in a vertical or substantially vertical position; and movable stops in said passages adapted to be moved so as to make the spaces between them greater in sorting coins, and so to separate and sort coins of different sizes, successively; substantially as described.

In testimony whereof I hereunto affix my signature in presence of two witnesses.

HENRY HOWARD HANMER.

Witnesses:
 FREDERICK JOHN CHEESBROUGH,
 JOHN HINDLEY WALKER.